United States Patent
Westphal et al.

(10) Patent No.: US 12,106,357 B2
(45) Date of Patent: Oct. 1, 2024

(54) CROWD SOURCED REAL-TIME SEARCH ENGINE FILTERS AND USER INTERFACES

(71) Applicant: W.W. Grainger, Inc., Lake Forest, IL (US)

(72) Inventors: Geoffry A. Westphal, Evanston, IL (US); Erwin Cruz, Hoffman Estates, IL (US); Svetlana Kharlamova, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 67 days.

(21) Appl. No.: 16/134,630

(22) Filed: Sep. 18, 2018

(65) Prior Publication Data

US 2019/0087887 A1   Mar. 21, 2019

Related U.S. Application Data

(60) Provisional application No. 62/560,025, filed on Sep. 18, 2017.

(51) Int. Cl.
*G06Q 30/0601* (2023.01)
*G06F 3/0482* (2013.01)
*G06F 3/04845* (2022.01)

(52) U.S. Cl.
CPC ....... *G06Q 30/0641* (2013.01); *G06F 3/0482* (2013.01); *G06F 3/04845* (2013.01); *G06Q 30/0631* (2013.01)

(58) Field of Classification Search
CPC ............ G06Q 30/0641; G06Q 30/0631; G06F 3/0482; G06F 3/04845

(Continued)

(56) References Cited

U.S. PATENT DOCUMENTS 6,804,675 B1 * 10/2004 Knight .................. G06F 16/337
                                                          707/999.102
8,490,010 B2 *  7/2013 Stienhans ............... G06F 9/451
                                                          715/789

(Continued)

FOREIGN PATENT DOCUMENTS

CA         2920099 C   *  1/2019  ............. H04L 67/22
EP         3244301 A1  * 11/2017  ............. G06F 9/453
WO   WO-2017205214 A1  * 11/2017  ........ G06F 16/90328

OTHER PUBLICATIONS

Soh, Harold, et al., "Deep Sequential Recommendation for Personalized Adaptive User Interfaces", Mar. 13-16, 2017, IUI '17: Proceedings of the 22nd International Conference on Intelligent User Interfaces (Year: 2017).*

*Primary Examiner* — Marissa Thein
*Assistant Examiner* — Thomas Joseph Sullivan
(74) *Attorney, Agent, or Firm* — Greenberg Traurig, LLP

(57) ABSTRACT

A user is provided a display or user interface that is tailored to the user based on a community the user is a part of. Based on interactions with and/or modifications to the display by other users of the community, the display or user interface is tailored to the user to show a similar display as desired by those in the user's community. This provides a better display or user interface that allows a user to quickly access product information and/or commerce functionalities that they are more likely to use. This display or user interface is displayed as an electronic document, such as a web page, that is viewed by the user in an electronic document viewing program, such as an Internet browser.

19 Claims, 10 Drawing Sheets

(58) Field of Classification Search
USPC .......................................................... 705/26.7
See application file for complete search history.

(56) References Cited

U.S. PATENT DOCUMENTS

| | | | | |
|---|---|---|---|---|
| 8,495,143 | B2* | 7/2013 | Zhou | G06Q 10/10 709/204 |
| 8,832,132 | B1* | 9/2014 | Spertus | G06F 16/248 707/765 |
| 9,983,775 | B2* | 5/2018 | Jain | G06F 3/0482 |
| 2003/0120599 | A1* | 6/2003 | Agboatwalla | G06F 16/954 705/50 |
| 2004/0034646 | A1* | 2/2004 | Kimball | G06F 3/0481 |
| 2007/0174266 | A1* | 7/2007 | Hsu | G06F 16/951 |
| 2007/0244775 | A1* | 10/2007 | Linder | G06Q 40/00 705/35 |
| 2009/0063178 | A1* | 3/2009 | Pousti | G06Q 30/04 705/319 |
| 2009/0171813 | A1* | 7/2009 | Byrne | G06Q 30/0623 707/999.005 |
| 2009/0228918 | A1* | 9/2009 | Rolff | H04N 21/4668 725/34 |
| 2009/0271371 | A1* | 10/2009 | Levin | G06F 16/29 |
| 2009/0276258 | A1* | 11/2009 | Dane | G06Q 10/063112 705/7.14 |
| 2012/0054653 | A1* | 3/2012 | Grossman | G06F 3/04812 715/764 |
| 2013/0031470 | A1* | 1/2013 | Daly, Jr. | G06F 16/9535 715/243 |
| 2013/0212487 | A1* | 8/2013 | Cote | G06F 9/451 715/745 |
| 2013/0268373 | A1* | 10/2013 | Grishaver | G06Q 30/02 705/14.67 |
| 2014/0164938 | A1* | 6/2014 | Petterson | G06F 3/0482 715/739 |
| 2015/0006286 | A1* | 1/2015 | Liu | G06Q 50/01 705/14.53 |
| 2016/0124958 | A1* | 5/2016 | Sinha | G06F 16/9535 707/733 |
| 2016/0140622 | A1* | 5/2016 | Wang | G06F 16/9577 705/14.66 |
| 2016/0241510 | A1* | 8/2016 | Kamdar | H04L 67/01 |
| 2016/0259840 | A1* | 9/2016 | Zheng | G06F 16/9577 |
| 2016/0342288 | A1* | 11/2016 | Konik | G06Q 30/0643 |
| 2016/0350875 | A1* | 12/2016 | Deb | G06Q 50/01 |
| 2017/0154295 | A1* | 6/2017 | Fang | G06Q 50/01 |
| 2017/0300862 | A1* | 10/2017 | Bhadouria | G06N 20/00 |
| 2018/0143744 | A1* | 5/2018 | Movsisyan | G06F 8/38 |
| 2019/0043127 | A1* | 2/2019 | Mahapatra | G06Q 10/105 |
| 2019/0171728 | A1* | 6/2019 | Wakankar | G06F 16/90324 |
| 2019/0205973 | A1* | 7/2019 | Gutnik | G06Q 50/01 |

* cited by examiner

CROWD SOURCED REAL-TIME SEARCH ENGINE FILTERS AND USER INTERFACES

RELATED APPLICATION INFORMATION

This application claims the benefit of U.S. Provisional Application No. 62/560,025, filed on Sep. 18, 2017, the disclosure of which is incorporated herein by reference in its entirety.

BACKGROUND

It is common for online consumers to browse the Internet, whether for the purpose of general entertainment or for the specific purpose of looking for product that the online consumer might be interested in purchasing. For example, these browsing activities may cause to be displayed products on a webpage or other electronic document, such that a user may select items for purchase.

SUMMARY OF THE INVENTION

The following describes systems, methods, graphical user interfaces, and computer readable media for providing a potential consumer with more relevant information on a graphical user interface (also referred to herein as a user interface) such as a webpage or other electronic document. By providing the potential consumer with information that is more relevant, it is believed that sales of product by the vendor of product can be substantially increased. More relevant results may be provided to the potential consumer by crowdsourcing data from other consumers or potential consumers, such as how they interact with graphical user interface display elements. For example, communities of consumers and potential consumers may be determined, and interactions with display elements of a graphical user interface of some members of that community may be applied to other members of that community. In another example, a potential consumer may interact with a graphical user interface to identify themselves with a particular community, and interactions with display elements of a graphical user interface made by at least some members of that community may be applied to the graphical user interface of the potential consumer. Although several embodiments herein describe determining communities of users and user interfaces based on interactions with display elements of an interface, it is contemplated that other factors may be used to determine communities of users and/or determine user interfaces either with or without considering interactions with display elements. For example, other factors may include other types of interactions with a website or electronic document (e.g., making a purchase, downloading a document, page view, duration of a page view, etc.), other factors relating to a user that are determined in ways other than through interactions with a display element, etc.

Accordingly, a user (e.g., a consumer, a potential consumer) of an electronic device may be provided a display or user interface on the electronic device that is tailored to the user based on a community the user is a part of. Based on interactions with and/or modifications to the display by other users of the community, the display or user interface is tailored to the user to show a similar display as desired by those in the user's community. This provides a better display or user interface that allows a user to quickly access more relevant product information and/or commerce functionalities that they are more likely to use. This display or user interface is displayed as an electronic document, such as a web page, that is viewed by the user in an electronic document viewing program, such as an Internet browser.

While not intended to be limiting, the display elements users may interact with via a graphical user interface, such as an electronic document or a web page, may include one or more of an image of a product, images representing groups of products, minimized images of products or groups of products, community information, consumer information, company information, community identification selection display elements, pricing information, availability information, product description information, product ratings information, product review information, etc.

A user may also interact with display elements on a graphical user interface such as commerce related functionalities that may include one or more of display elements or links for use in placing product into an online shopping cart, causing a display of a Product Details page, causing a display of a catalog page from a catalog, transmitting a message to a recipient containing product related information, adding product to a list, causing a display of a product MSDS sheet, invoking a selection guide, causing a display of product accessories, causing a display of a list of locations at which product is available for purchase, causing a display of product repair information, causing a display of a discount offer associated with product, invoking additional searching or refining tools, or the like as generally disclosed in U.S. Published Application No. 2012/0259730 which is incorporated herein by reference in its entirety.

The commerce related functionalities may be linked to product related information, e.g., the product that is the subject of the product related information would be the product that is addable to the shopping cart, the product for which accessories would be shown, the product for which availability would be displayed, etc.

The display elements of a graphical user interface may be interacted with in different ways by a user. For example, an interaction may be minimizing or maximizing a display element of a graphical user interface, selecting a display element of the graphical user interface, entering information into the graphical user interface, indicating a community with which a user or company of a user is associated with, other data collected at a user device (e.g., location information, login information, other webpages visited by the user device), highlighting or otherwise selecting/mousing over an image and/or text within the webpage or electronic document being viewed and/or an inference that a display element is being interacted with or will be interacted with by, for example, sensing that the user has positioned or left a cursor over an image or text (or in the area of an image or text) within the electronic document for a predetermined period of time.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to embodiments shown in the attached drawings in which.

DETAILED DESCRIPTION

Figure 1:
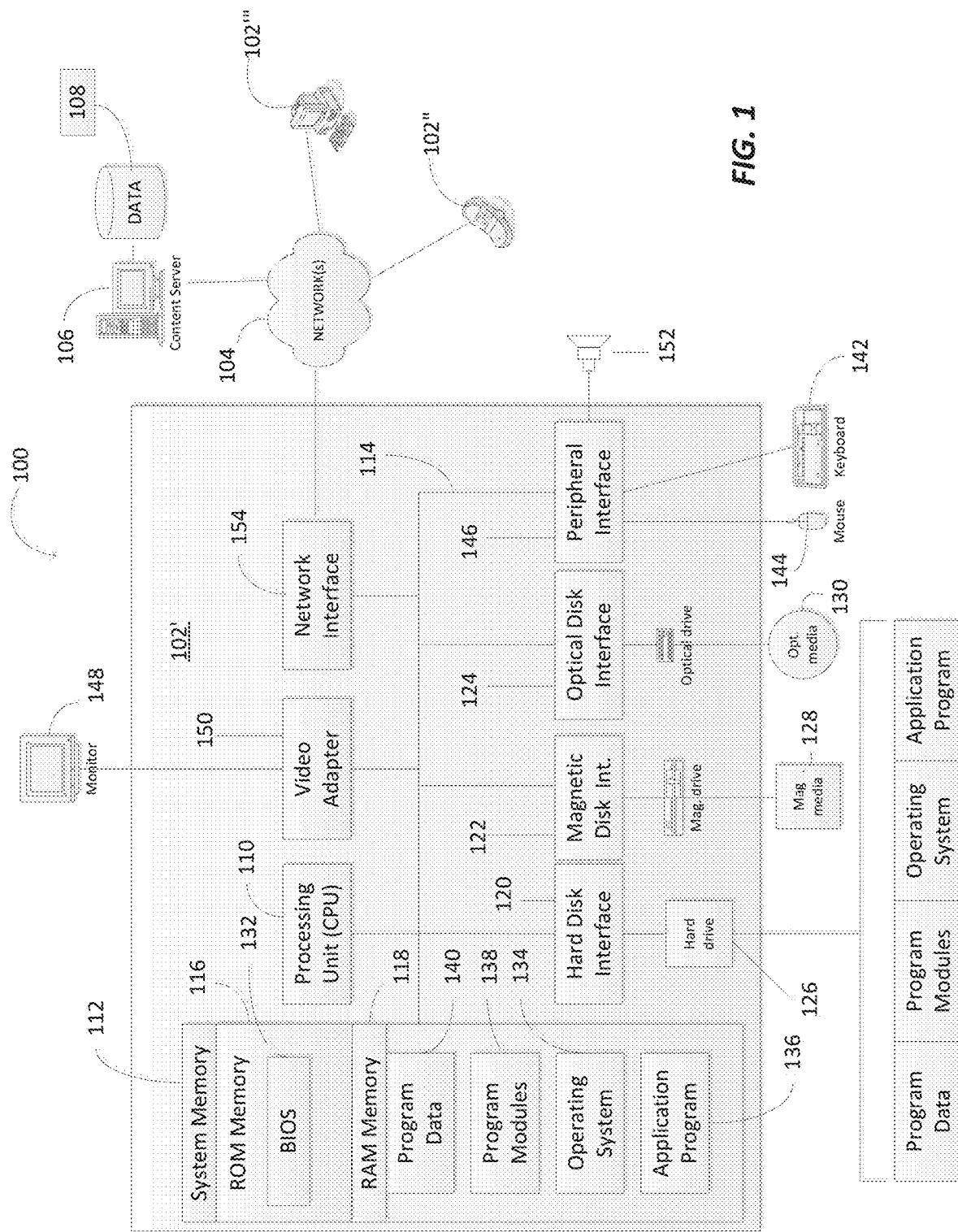
FIG. 1 is a block diagram illustrating components of an exemplary network system in which the methods described hereinafter may be employed.

With reference to the figures, systems, methods, graphical user interfaces, and computer readable media are hereinafter described for providing display elements on a user interface that may be interacted with by a user. Those interactions may be associated with a community of users, and user interfaces delivered to other users of the community may be adjusted according to the interactions with the user interface by members of the community. The user interface may be an electronic document, such as a web page, a PDF document, an augmented reality (AR) interface, a virtual reality (VR) interface, a virtual assistant interface (e.g., Amazon Alexa™, Google Home™, Apple's Siri™), etc., that is currently being viewed by the consumer in a corresponding electronic document viewing program, such as an Internet browser, PDF viewer, etc.

The systems, methods, graphical user interfaces, and computer readable media described herein relate to graphical user interfaces (also referred to herein as user interfaces) that may be image-based, text-based, or some combination thereof. These user interfaces may be adjusted based on interaction by users. These interactions may be associated with particular communities of users. When these communities or groups of users are identified, a user interface sent to or otherwise displayed to a user may include modifications to a default user interface based on interactions with display elements of other users in the same community or communities. For example, a display element relating to a group of products that a user is not interested in may be minimized by the user. If a certain number of users in a community minimize the same display element relating to the same group of products, that display element may be minimized for future users that are determined to be part of the community.

Advantageously, the systems, methods, graphical user interfaces, and computer readable media described herein provide customizable interfaces that present more relevant information to users, without each user having to customize their interface. Such interfaces represent an advantage over current e-commerce products where the same interface is delivered to all users, regardless of the user or type of user accessing the interface. The customizable interfaces disclosed herein may be advantageously utilized in business to consumer (B2C) or business to business (B2B) contexts.

As described herein, links, images, text, and other types of display elements may be displayed as part of a user interface. However, some groups of users may never click on or utilize certain parts, categories, or display elements of an interface. For example, users who identify as older, single males may not interact with a display element related to baby-care products. Accordingly, baby-care display elements may be hidden or minimized from users determined to be part of a demographic community that includes older, single males. Accordingly, display elements of a user interface may be adjusted not only based on interactions with certain display elements, but also based on a failure of a community of users to interact with certain display elements. Current interfaces clutter an interface with display elements related to, for example, product categories and subcategories that are irrelevant to some users, making a user experience sub-optimal. Accordingly, the systems, methods, graphical user interfaces, and computer readable media uses interactions from groups of users who share a common identity, demographic, field, employer, or other factor to modify the links and images for users identified as part of a group in order to simplify a user interface and improve the user experience.

A community is described herein as a group or collection of users who have something in common, for example similar demographics, purchasing behavior, field, employer, roles, industries, etc. These factors in common may be inferred based on certain factors or may be expressly indicated by a user as described herein. These factors may also be inferred based on behaviors and/or interactions of a user made on one or more electronic devices (e.g., smart phone, tablet, smart watch, etc.). For example, a user that purchases materials known to be commonly purchased by bakeries may be inferred to be part of a bakery community. This may occur even if the user makes these purchases on different electronic devices. In another example, a user interaction with a display element may indicate or input that that the user is employed by a particular company, which may be known to be in the baking industry. The user may then be associated with the bakery community. In either scenario, the user may then be sent one or more user interfaces that include more relevant display elements based on the interactions (or lack of interactions) with display elements by other users in the bakery community.

Numerous methods may be used to determine or identify one or more communities with which to associate a user. For example, a name of a company may be used (e.g., a company named XYZ Muffler and Brakes may be determined to be an auto repair company based on its name). Standard Industrial Codes (SIC), business hierarchy classifications of a business unit of a company, prior purchase behavior, etc. may also be used to determine a community for a user. In another example, a user may explicitly opt in to a community (e.g., a user searching for products may select a community that they are a part of). In another example, a user may be assigned to one or more communities manually by another user (e.g., an administrator of a vendor who sells products using the user interfaces described herein).

Providing these customized user interfaces based on crowdsourcing to a user as described herein advantageously allows a user to more efficiently view and/or purchase items and/or categories of items through a user interface, such as a website. Advantageously, the items and/or categories of items are more relevant to a user. Accordingly, a user may purchase one or more products while spending less time on a website because of the improved user interface. In various embodiments, graphical control elements such as the display elements described herein are provided that enable a user to interact with those display elements (e.g., purchase, add to cart, minimize, maximize, etc.) at a single page or interface portion. These interactions are utilized to optimize interfaces for the user and other users in the future, thereby reducing user time and effort by eliminating the need for the user to perform repetitive interactions with certain display elements. As a result, providing display elements on a user interface according to the techniques of the present disclosure solves an internet-centric problem—streamlining user interaction with a website or other electronic user interface to make it less cluttered and present more relevant results—through methods and systems necessarily rooted in computer technology.

Accordingly, the systems, methods, and computer readable media described herein provide for improved graphical user interfaces. Delivering a user interface to a user that has display elements that are more relevant to a user is a demonstrable improvement that allows user to quickly and easily select, unselect, add to a cart, purchase, view, and otherwise interact with display elements on a single interface, such as a webpage. In other words, the description herein provides for a particular manner of summarizing and presenting information by and on electronic devices, and include specific manners of displaying a limited set of relevant information to a user, rather than using conventional user interface methods to display generic information on a computer. In particular, the improved interfaces described herein prevent a user from having to view information that is not relevant to a user and prevents a user from repeatedly having to minimize information that is not relevant to a user and/or maximize information that is relevant to a user. This allows a user to see the most relevant data quickly and easily.

As a result, the techniques of the present disclosure solve an internet-centric problem—streamlining user interaction with a website or other electronic user interface—through methods and systems necessarily rooted in computer technology. Additionally, the techniques described herein provide improved functioning of a website accessed by a user. A user may stop using a website or interface that is not helpful and does not present relevant information. A user may then move on to use another website, and the e-commerce website therefore may lose a potential user. Thus, the systems and methods described herein provide for interfaces that advantageously present more relevant information to prevent a user from navigating away to another website.

Applying the various embodiments described herein can also advantageously cause a website or other electronic document through which the disclosed user interfaces are displayed to function better. For example, once a user is determined to be a part of a community and a user interface sent to the user's electronic device(s) is customized based on that community, the user interface may include less text, images, links, and/or other display elements than a non-customized user interface. This may result in faster page loads of webpages or other electronic documents that include the customized user interface. A server sending the user interface to a user electronic device may also therefore perform better, serve more users, etc. E-commerce websites can often suffer outages during popular sales or at other times when traffic is high. Advantageously, using the embodiments described herein, these customized user interfaces may also reduce outages, slow performing servers, etc.

As illustrated in FIG. 1, a system 100 will be described in the context of a plurality of example processing devices 102 linked via a network 104, such as the World Wide Web or the Internet. In this regard, a user processing device 102' illustrated in the example form of a computer system, a user processing device 102'' illustrated in the example form of a mobile device, or a user processing device 102''' illustrated in the example form of a personal computer provide a means for a user to access a website content server 106 via the network 104 and thereby gain access to content such as media, data, webpages, an electronic catalog, etc., stored in a repository 108 associated with the content server 106. Although only one of the processing devices 102 is shown in detail in FIG. 1, it will be understood that in some examples the user processing device 102' shown in detail may be representative, at least in part, of the other user processing devices 102'', 102''', including those that are not shown.

Furthermore, the website content server 106 and/or the user processing devices 102 allow users to read and/or write data from/to the website content server 106. A user's interactions with the content offered by a website are stored in the repository 108 associated with the content server 106 and are further indexed to a particular user (e.g., using log-in information, an internet protocol (IP) address, or other information that the content server 106 may utilize to identify the user or at least a device). Storing such information can be accomplished, for example, by monitoring user interactions with a website during web browsing sessions by recording events, accessed content, and other data such as the following: keyword searches; model number searches; stock-keeping unit (SKU) searches; selection guides; clicked links; links that a user's mouse hovered over for any measurable period of time; accessed menus; products viewed; number of products reviewed; product images that were magnified; product comparisons; times during which webpages by using log-in credentials and/or other content was viewed or accessed; duration of stay; dialogs of chat sessions; audio recordings of telephonic conversations between the user and a user service representative; identities of employees with which the user interacts; notes from users, peers (e.g., another company employee or an employee from another company), service representatives, or technical representatives; lists of products generated by users; order histories; quantities of each product ordered; pending orders; user alerts; user preferences; personal information (e.g., created by or provided for the user); or information that the content server 106 may utilize to identify the user. In short, the system 100 may in some examples record virtually all aspects regarding users' visits to the website and/or other relevant network activity. Any of these interactions with a website may be used to identify a user, determine a community the user is part of, and/or determine changes to make for a user interface of a community.

In addition to storing information regarding a user's visits to the website, the content server 106 and/or the repository 108 associated with the content server 106 may also contain a collection of documents or other content relating to products, product hierarchies, pricing, user communities, rules for assigning or determining user communities to which users belong, news, events, how-to guides, part manuals, instruction manuals, and/or other information.

In another example, the information relevant to the user's interactions with the content offered by the website (including with display elements and other types of interactions)

may also or alternatively be stored on the user processing devices 102 and/or other storage media local to the device 102, for example, in cases where a user has not logged into the website content server 106 and is anonymously navigating the content provided by the website content server 106. In this case, users' interactions with the web content offered by the website content server 106 may be stored, for example, in cookies and/or other temporary or persistent files placed on the user processing devices 102 using well known techniques. Because the manner by which the user processing devices 102 are used to access and navigate the website offered by the website content server 106, the manner by which the website content server 106 makes content available to the user devices 102, and the manner by which the website usage is monitored—are all well known in the art, they will not be discussed further herein for the sake of brevity. However, any of these types of saved content (e.g., cookies) may be used to identify a user, determine a community the user is part of, and/or determine changes to make for a user interface of a community.

For performing the functions required of the user processing devices 102 and the content server 106, the user processing devices 102 and the content server 106 include computer executable instructions that reside in program modules stored on any non-transitory computer readable storage medium that may include routines, programs, objects, components, data structures, etc. that perform particular tasks or implement particular abstract data types. Accordingly, one of ordinary skill in the art will appreciate that the user processing devices 102 and the content server 106 may be any device having the ability to execute instructions such as, by way of example, a personal computer, mainframe computer, personal-digital assistant (PDA), tablet, cellular telephone, mobile device, e-reader, or the like. Furthermore, while the user processing devices 102 and the content server 106 within the system 100 are illustrated as respective single devices, those having ordinary skill in the art will also appreciate that the various tasks described hereinafter may be practiced in a distributed environment involving multiple processing devices linked via a local or wide-area network whereby the executable instructions may be associated with and/or executed by one or more of multiple processing devices. The executable instructions may be capable of causing a processing device to implement any of the systems, methods, and/or user interfaces described herein.

More particularly, the user processing device 102', which may be representative of all user processing devices 102 and the content server 106 illustrated in FIG. 1, performs various tasks in accordance with the executable instructions. Thus, the example user processing device 102' includes one or more processing units 110 and a system memory 112, which may be linked via a bus 114. Without limitation, the bus 114 may be a memory bus, a peripheral bus, and/or a local bus using any of a variety of well-known bus architectures. As needed for any particular purpose, the example system memory 112 includes read only memory (ROM) 116 and/or random access memory (RAM) 118. Additional memory devices may also be made accessible to the processing device 102' by means of, for example, a hard disk drive interface 120, a removable magnetic disk drive interface 122, and/or an optical disk drive interface 124. Additional memory devices and/or other memory devices may also be used by the user processing devices 102 and/or the content server 106, whether integrally part of those devices or separable from those devices (e.g., remotely located memory in a cloud computing system or data center). For example, other memory devices may include solid state drive (SSD) memory devices. As will be understood, these devices, which may be linked to the system bus 114, respectively allow for reading from and writing to a hard drive 126, reading from or writing to a removable magnetic disk 128, and for reading from or writing to a removable optical disk 130, such as a CD/DVD ROM or other optical media. The drive interfaces and their associated tangible, computer-readable media allow for the nonvolatile storage of computer readable instructions, data structures, program modules and other data for the user processing device 102'. Those of ordinary skill in the art will further appreciate that other types of tangible, computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 132, containing the basic routines that help to transfer information between elements within the user processing device 102', such as during start-up, may be stored in the ROM 116. Similarly, the RAM 118, the hard drive 126, and/or the peripheral memory devices may be used to store computer executable instructions comprising an operating system 134, one or more applications programs 136 (such as a Web browser), other program modules 138, and/or program data 140. Still further, computer-executable instructions may be downloaded to one or more of the computing devices as needed, for example, via a network connection.

A user may enter commands and information into the user processing device 102' through input devices such as a keyboard 142 and/or a pointing device 144 (e.g., a computer mouse). While not illustrated, other input devices may include for example a microphone, a joystick, a game pad, a scanner, a touchpad, a touch screen, a motion sensing input, etc. These and other input devices may be connected to the processing unit 110 by means of an interface 146 which, in turn, may be coupled to the bus 114. Input devices may be connected to the processor 110 using interfaces such as, for example, a parallel port, game port, firewire, universal serial bus (USB), or the like. To receive information from the user processing device 102', a monitor 148 or other type of display device may also be connected to the bus 114 via an interface, such as a video adapter 150. In addition to the monitor 148, the user processing device 102' may also include other peripheral output devices such as a speaker 152. Any of the input devices may be used by a user to interact with a webpage, display element, etc., and may therefore be used to identify a user, determine a community the user is part of, and/or determine changes to make for a user interface of a community.

As further illustrated in FIG. 1, the example user processing device 102' has logical connections to one or more remote computing devices, such as the content server 106 which, as noted above, may include many or all of the elements described above relative to the user processing device 102' as needed for performing its assigned tasks. By way of further example, the website content server 106 may include executable instructions stored on a non-transient memory device for, among other things, presenting webpages, handling search requests, providing search results, providing access to context related services, redeeming coupons, sending emails, managing lists, managing databases, generating tickets, presenting requested user specific information, generating deals, etc. Communications between the user processing device 102' and the content server 106 may be exchanged via a further processing device, such as a network router (not shown), that is responsible for network routing. Communications with the network router may be performed via a network interface component 154. Thus, within such a networked environment (e.g., the Internet, World Wide Web, LAN, or other like type of wired or wireless network), it will be appreciated that program modules depicted relative to the user processing device 102', or portions thereof, may be stored in the repository 108 of the content server 106. Additionally, it will be understood that, in certain circumstances, various data of the application and/or data utilized by the content server 106 and/or the user processing device 102' may reside in the "cloud." The website content server 106 may therefore be used to implement any of the systems, methods, computer readable media, and user interfaces described herein. For example, the website content server 106 may determine interactions with a webpage or electronic document by one or more users (e.g., such as interactions with a display element), determine communities for the one or more users, and send one or more user interface to the one or more users' electronic device based on the determined communities.

Figure 2:
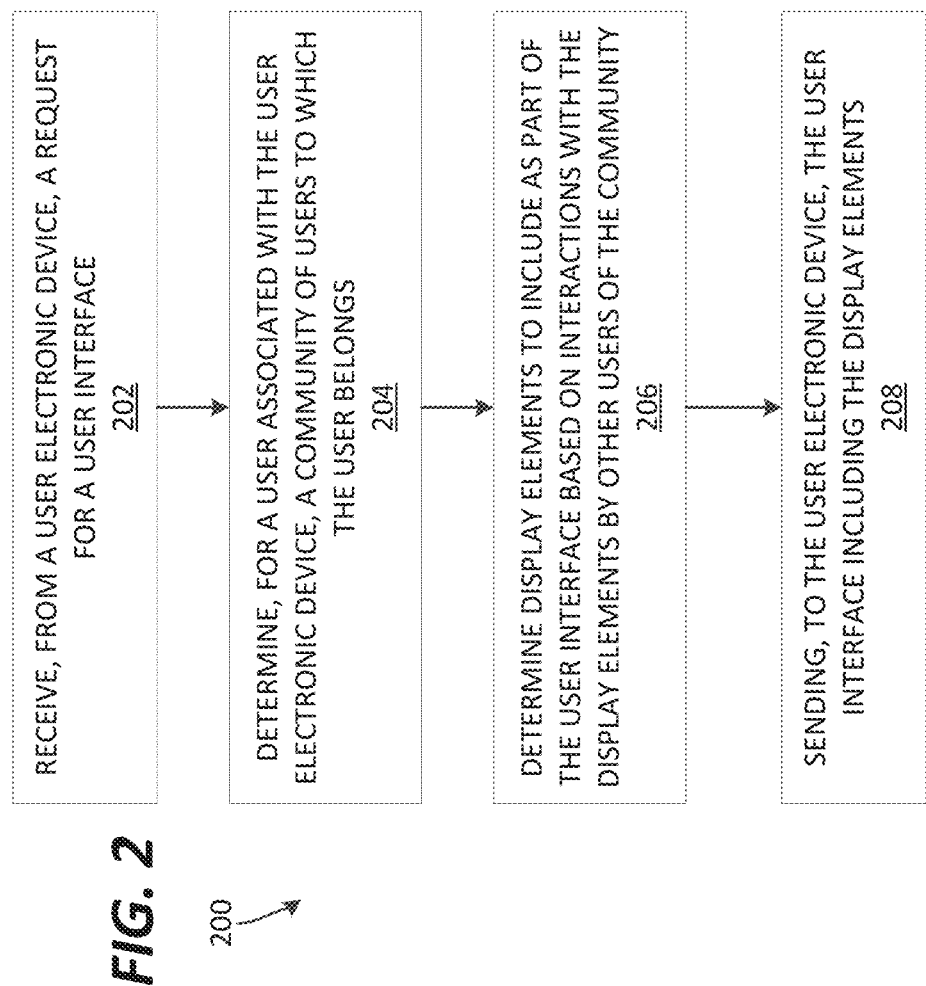
FIG. 2 is a flow diagram illustrating an exemplary method for displaying a user interface customized based on interactions of users of a community.

FIG. 2 is a flow diagram illustrating an exemplary method 200 for displaying a user interface customized based on interactions of users of a community. In an operation 202, a server receives, from a user electronic device, a request for a user interface. For example, the server may be the website content server 106 of FIG. 1, and the user electronic device may be the user processing device 102' of FIG. 1. The request for the user interface may occur, for example, when a user clicks on a link, enters a universal resource locator (URL) into a browser, opens an Internet browser or other software application, or by some other method.

In an operation 204, the server determines, for a user associated with the user electronic device, a community of users to which the user belongs. The user may be determined to belong to a community based on one or more interactions with a webpage or other electronic document as described herein, including with one or more display elements. In some embodiments, the interaction with a display element may be an interaction with advertisements (e.g., pay-per-click (PPC) advertisements). The community a user belongs to may also be determined based on other methods. A community may be determined based on what company the user is employed at (e.g., the user works at a same or similar company as the other users of the community), based on an industry that the user works in (e.g., the user works in a same or similar industry as the other users of the community), based on a job title of the user (e.g., has a similar job title as the other users of the community, has a job title that indicates an industry of the user, has a job title that otherwise indicates what community the user should be a part of), based on a demographic of the user (e.g., a user's age, location, gender, sex, number of children, marital status, income), or any combination thereof.

The community of users to which a user belongs may also be determined in various embodiments by determining that the user electronic device being used by the user is associated with a company that is associated with the community or is in a similar physical location as the other users of the community. In other words, rather than determining a location of a user, address of a user, etc. the system may utilize a location of the user location device as a proxy to determine where a user is, where a user works, where a user lives, etc. in order to determine a community or communities to classify the user in. Any of the methods for determining what community a user is part of as described herein may also be used in combination with one another. For example, in an embodiment, the community may be determined by determining a company associated with the user electronic device, determining an industry associated with the company, and determining the community based on the determined industry.

Other various factors may also be used to decide when to propagate an interaction or user interface change to other members of a community, such as number of users who purchase within a product category, the actual number of minimizations a product category has had, the percentage of minimizations of a node compared with the sales under that product category, temporal information (e.g., time of day, time of year, location within a business cycle (e.g., back to school, planting season)), geographic location (e.g., users that share climate similarities may share similar interfaces), etc.

In various embodiments, the community or communities of a user may also be determined based on an input by the user into the user electronic device. For example, the server may receive a selection from the user electronic device to opt into a community. The selection may be input by the user through a display element of the user interface, or through any interface of a processing device (e.g., mouse, keyboard, etc.).

In various embodiments, the community of users to which the user belongs may be determined based on an assignment of the user or the user electronic device to the community. For example, a network administrator of the website or other person with control/access to the server may assign particular users to a community. In this way, such an association is similar to a user making an input to associate with a community, except the input is by a party or person other than the user themselves. In some embodiments, the assignment of a user to a community may also be automated. In an automated process, rules may be established using (e.g., using some of the criteria established herein) that are implemented to assign users to one or more communities. For example, a rule that all buyers that access a website from devices associated with construction companies will be associated with a construction company community.

A vendor may also create an interface with pre-existing display elements minimized and maximized. These pre-configured interfaces may be assigned to users based on various things. For example, if a user or entity associated with the user (e.g., the user's employer) purchases a large number or type of products compared to other users or entities associated with other users, that user or entity that purchases a large number or type of products may be assigned a user interface with more products or product types/hierarchies displayed. In contrast, a user or associated entity that purchases a relatively fewer number or type of product may be assigned an interface that has common display elements or display elements previously used by the user/entity maximized. However, as described herein, a user may still modify their user interface after being assigned an interface.

In various embodiments, various other interactions with display elements and/or other types of interactions may be used to determine a community of a user. For example, buying habits of a user, search history of a user, time spent on a webpage, browsing history, cookies, voice commands received through a microphone, and any other interaction may be utilized to determine a community of a user.

As described herein, assigning a user or user device to a community (e.g., determining a community to which a user or user device belongs) may be performed according to various factors. In various embodiments, combinations of the factors described herein may be used to assign a user or user device to a single community and/or assign a user or user device to multiple communities. In various embodiments, data science, machine learning, deep learning, and/or artificial intelligence algorithms may be used to determine the factors used to make assignments, actually make assignments, and/or predict (or estimate or guess) factors for making assignments. In various embodiments, example algorithms and/or methods including a cultural algorithm (CA), collaborative filtering (CF), singular-value decomposition (SVD), association rules (AR), market-to-basket (MBA), Word2Vec models, clustering, classification, etc., or any combination thereof could be used together with bias optimization and artificial neural networks embedded to assign users or user devices to communities. These algorithms may take into account the various factors described herein to cluster users or user devices (e.g., into communities) and track overlaps of customer-community relationships. These algorithms may also track factors for assigning communities in real time, so that factors such as user behavior/interactions (or any other factor) may be taken into account immediately as it happens to assign a user or user device to a new community, remove the user or user device from a community, etc.

In an operation 206, the server determines a subset of a plurality of display elements to include as part of the user interface based, at least in part, on one or more interactions with one or more of the plurality of display elements by other users of the community. In other words, the server determines a particular user interface for the user based on what community the user is a part of. For example, modifications of a user interface that have been implemented by a predetermined number or percentage of members in the determined community may be implemented in the user interface for the user. For example, if a community of users often looks at or otherwise interacts with a particular product, products, product category, etc. on a user interface, one or more display elements associated with any of that particular product, products, product category, etc. may be included on the user interface. If a community of users does not often look at or otherwise interact with a particular product, products, product category, etc. on a user interface, one or more display elements associated with any of that particular product, products, product category, etc. may not be included on the user interface.

In some embodiments, the subset of the plurality of display elements to include as part of the user interface may be determined based on past purchases made by the user or an entity associated with the user. For example, if a company has multiple buyers or users that typically purchase the same products over and over again, those products may be displayed to a user of that company, even if that particular user has never purchased the product before.

In some embodiments, users of a community may interact with display elements of an interface to minimize (e.g., hide) or maximize (e.g., show) certain other display elements, such as display elements representing a product or category/group of products. The server may further determine what to include in the user interface based on maximizations and minimizations made by a community of users. For example, display elements may be included as part of the user interface may include a graphical indication of at least one maximized product category where a predetermined number of users of a community previously maximized that product category. In another example, display elements included as part of the user interface may include a graphical indication of at least one minimized product category where a predetermined number of users of a community previously minimized that product category. In various embodiments, the user interface may include some maximized and some minimized display elements. The minimized display elements may be located in a separate section of the user interface than the maximized display elements.

As described herein, various types of interactions with a webpage, display elements, etc. and other types of interactions may be utilized to determine a user interface to send to a user electronic device. These interactions may be received at a server from a plurality of electronic devices associated with other users of a community. As described herein, those interactions may be, for example, a minimization or maximization of a display element; a relocation or move of a display element; a selection of a product category, a product hierarchy, or a product set; a selection of a display element associated with or indicating a community; or any other type of interaction.

In an operation 208, the server sends, to the user electronic device, the user interface including the subset of the plurality of display elements determined based on the determination that the user is part of one or more communities. In this way, a crowdsourced method can be used to provide more relevant displays/interfaces to users. In particular, the interactions with display elements by users of the community may be used to determine a subset of those display elements to send to a user determined to be a part of that community.

Figure 3:
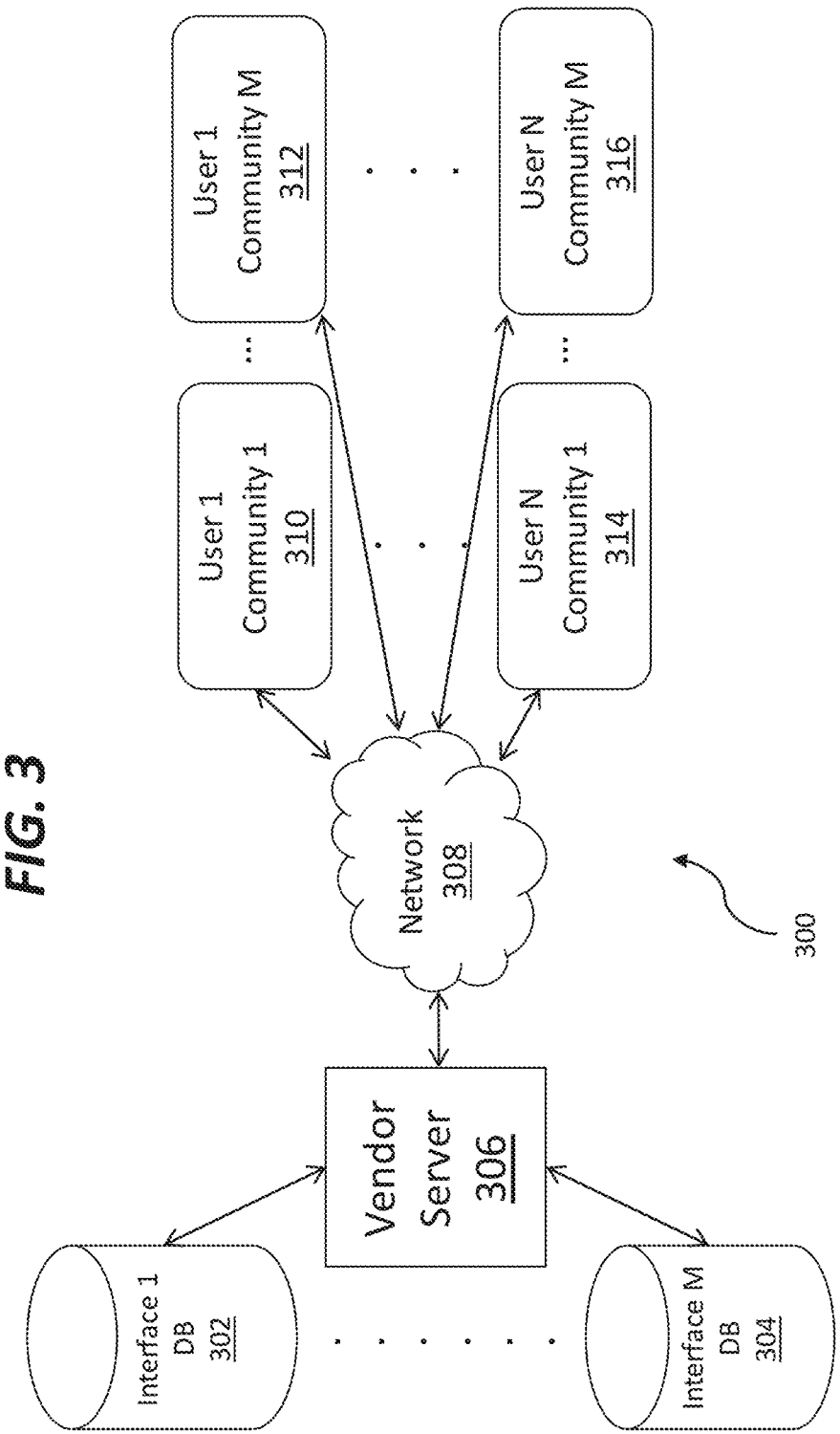
FIG. 3 is a block diagram illustrating an exemplary system in which users are grouped into communities for displaying user interfaces to user devices.

FIG. 3 is a block diagram illustrating an exemplary system 300 in which users are grouped into communities for displaying user interfaces to user devices. The system 300 shows that there may be an arbitrary number of communities and an arbitrary number of users within any given community. A user may belong to one or more communities at the same time. Relationships 310, 312, 314, and 316 between users and communities demonstrate how users may be associated with one or more communities. Relationship 310 shows that User 1 is associated with a Community 1. Any number of users, up to User N, may be associated with Community 1 as shown in the relationship 314. The User 1 may be associated with any number of communities, shown as Community M in the relationship 312. Accordingly, any number of users, represented by User N, may be associated with any number of communities, represented by Community M, as shown in the relationship 316. Accordingly, the user devices associated with the users can communicate with a network 308 according to the relationships 310, 312, 314, and 316 to have more relevant user interfaces displayed.

In the system 300, there is also a database for every community. In some embodiments, these multiple databases may be a single database where data relating to multiple communities is stored. These databases may be maintained by and/or located on a vendor server 306. The vendor server 306 may be, for example, a server operated to provide user interfaces to user device through the network 308. The user interfaces may, for example, relate to an e-commerce platform such that users may be presented with relevant information that makes it easier to navigate an e-commerce website and make purchases. These databases further may keep track of user interactions, such as display element minimizations and maximizations. For example, an Interface 1 Database (DB) 302 keeps track of user interactions (with display elements or otherwise) of Community 1. An Interface 2 DB 304 keeps track of user interactions (with display elements or otherwise) of Community M.

The interface databases 302 and 304 may further include information to determine how to adjust user interfaces for members of the community. For example, the databases may track user interactions that are not yet prevalent enough to justify altering the user interfaces of other members of the community. In another example, the databases may include information about interactions that rise to a threshold where the other members of the community's interfaces should be adjusted accordingly. Each user may also have a version of each interface stored in the interface databases. For example, a user interface with certain adjustments may be delivered to users determined to be part of Community 1. However, if a user modifies the user interface to, for example, minimize/hide a certain display element, an indication that the user has minimized that display element may be saved in the Interface 1 DB 302. When that particular user subsequently requests that user interface, the user interface may be adjusted to minimize/hide that certain display element, even if the user interface sent to other members of Community 1 does not have that display element minimized/hidden. In this way, a user's interfaces on their electronic devices may be customized beyond just adjusting the interface based on interactions of other users in the community.

Figure 4:
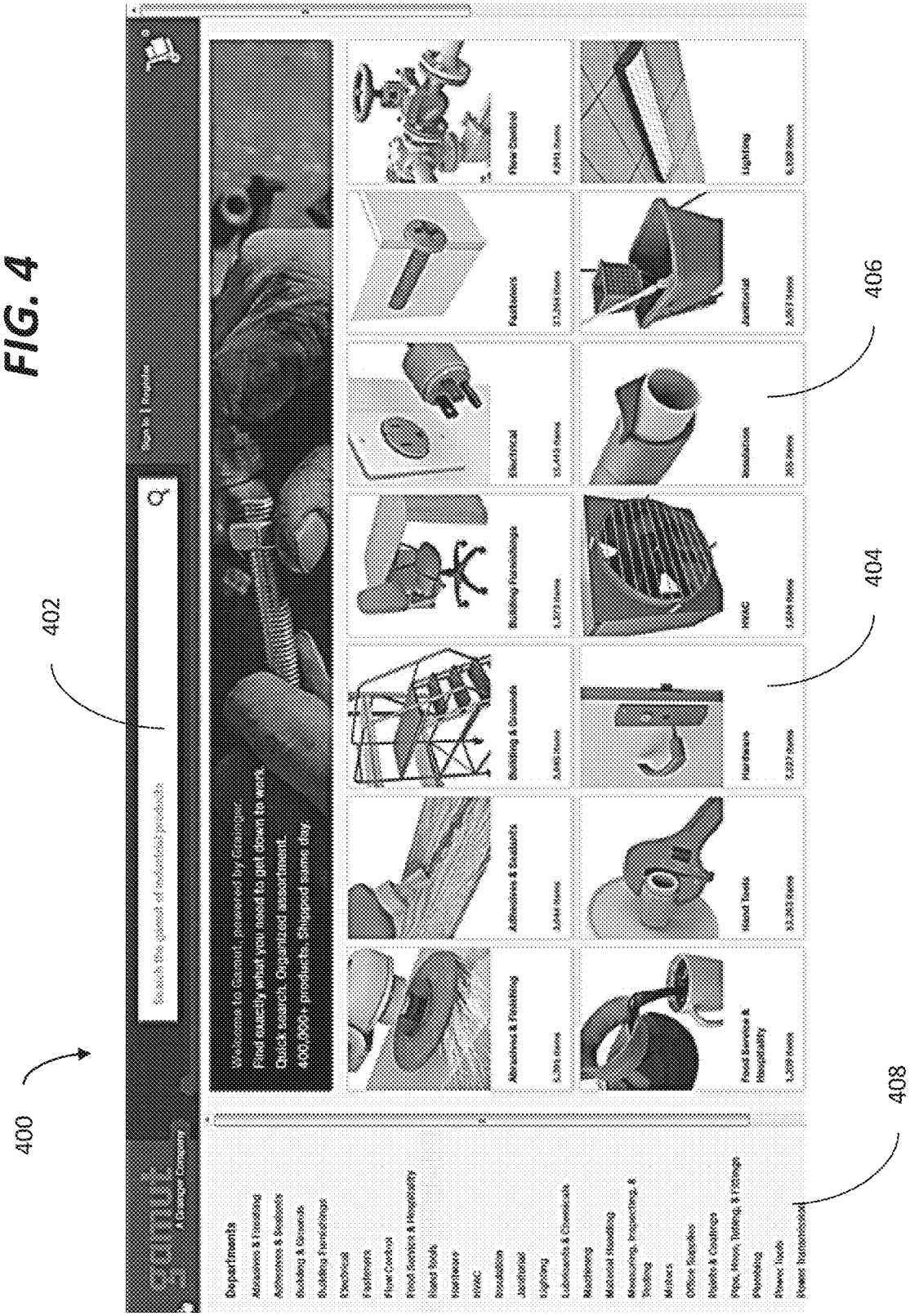
FIG. 4 illustrates an exemplary user interface that may be interacted with by a user.

FIG. 4 illustrates an exemplary user interface 400 that may be interacted with by a user. Various aspects of the interface 400 may be selected, interacted with, etc. This is a sample interface that has no modifications to it. Those interactions may be tracked by the system to make changes to how that interface is delivered to users in the future as described herein. In the example of the interface 400, no crowdsourced information has been used to minimize display elements such as product hierarchy images or otherwise modify the user interface.

The user interface 400 shows a drill down interface that includes display elements relating to groups of products. For example, display element 404 relates to a hardware product category, and display element 406 relates to an insulation product category. A display element 402 is a search bar, where a user can enter alphanumeric characters to look for products, product categories, etc. Display element 408 of the user interface 400 shows a department listing that may also be interacted with to display more information relating to those departments or products in those departments.

Figure 5:
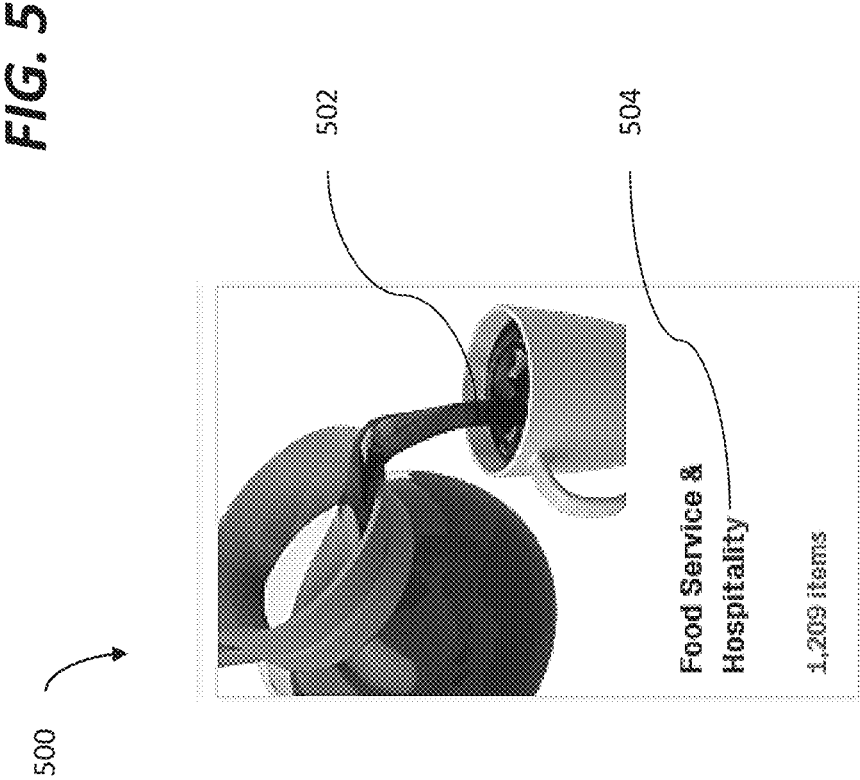
FIG. 5 illustrates an exemplary display element of a user interface that may be interacted with by a user.

FIG. 5 illustrates an exemplary display element 500 of a user interface that may be interacted with by a user. The display element 500 is an example of a clickable product hierarchy image relating to food service and hospitality products, and is an example of a display element from FIG. 4. Clicking on the display element 500 causes a new page to be presented with subcategory clickable images under that hierarchy node being displayed. Other embodiments may cause a pop up window or other methods of presenting information to happen upon interaction with the display element 500. The display element 500 includes a graphic display element 502 and a text display element 504, either of which may be interacted with by a user to display more information about the product category.

Figure 6:
FIG. 6 illustrates an exemplary maximized display element of a user interface that may be minimized by a user.

FIG. 6 illustrates an exemplary maximized display element 600 of a user interface that may be minimized by a user. In particular, this is an example of a product hierarchy image with a minimize display element 602 in the upper right. The minimize display element 602 may be interacted with to minimize the display element 600 as described herein. A minimized display element 700 is shown in FIG. 7.

Figure 7:
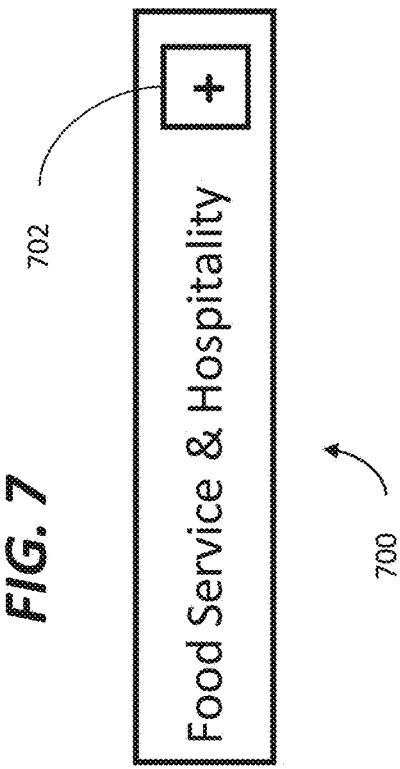
FIG. 7 illustrates an exemplary minimized display element of a user interface that may be maximized by a user.

FIG. 7 illustrates an exemplary minimized display element 700 of a user interface that may be maximized by a user. The minimized display element 700 represents a minimized product hierarchy image, such as the one shown in FIG. 6. The maximize display element 702 may be interacted with to maximize the display element 600 back to a full display. In FIG. 7, the minimized display element 700 still shows text associated with the product category. In various embodiments, the minimized display element 700 may show more or less that the minimized display element 700. For example, the entire minimized display element 700 may be hidden, or additional information may be shown, such as a smaller version of the image in the maximized display element 600 and/or the number of items listed in the maximized display element 600.

Figure 8:
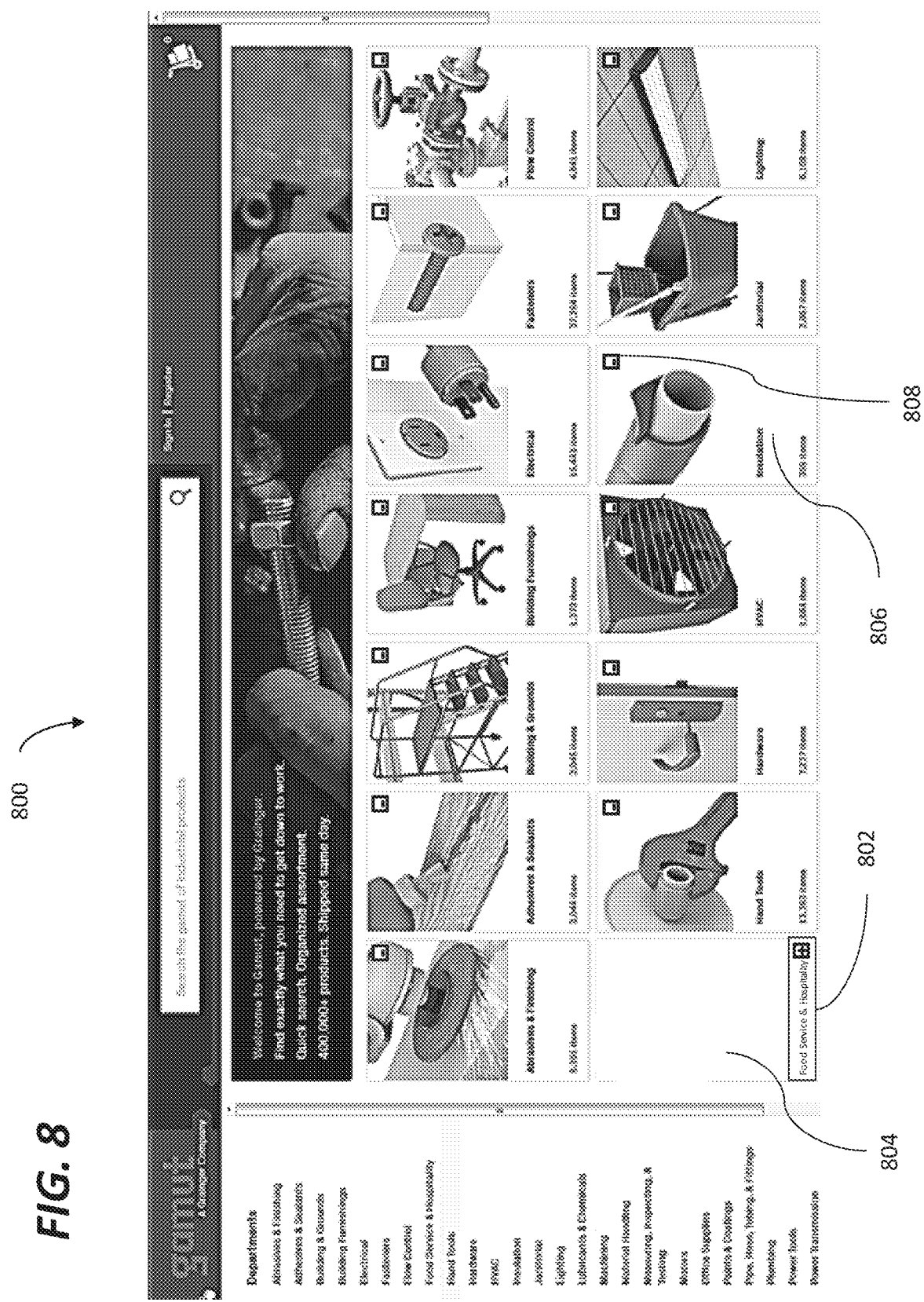
FIG. 8 illustrates an exemplary user interface with a minimized display element.

FIG. 8 illustrates an exemplary user interface 800 with a minimized display element 802. The minimized display element 802 is similar to the minimized display element 700 of FIG. 7. The user interface 800 also includes a space 804 where a maximized version of the minimized display element 802 would be shown if it was not minimized. The name of the product category is still visible in the minimized display element 802. Other display elements, such as display element 806, include a minimize display element, such as a minimize display element 808, in the upper right corner. In this way, other display elements may be interacted with to minimize and/or maximize display elements. If the maximize display element of the minimized display element 802 is interacted with by the user, the product hierarchy image will expand the image back to original size as shown in FIG. 6.

Figure 9:
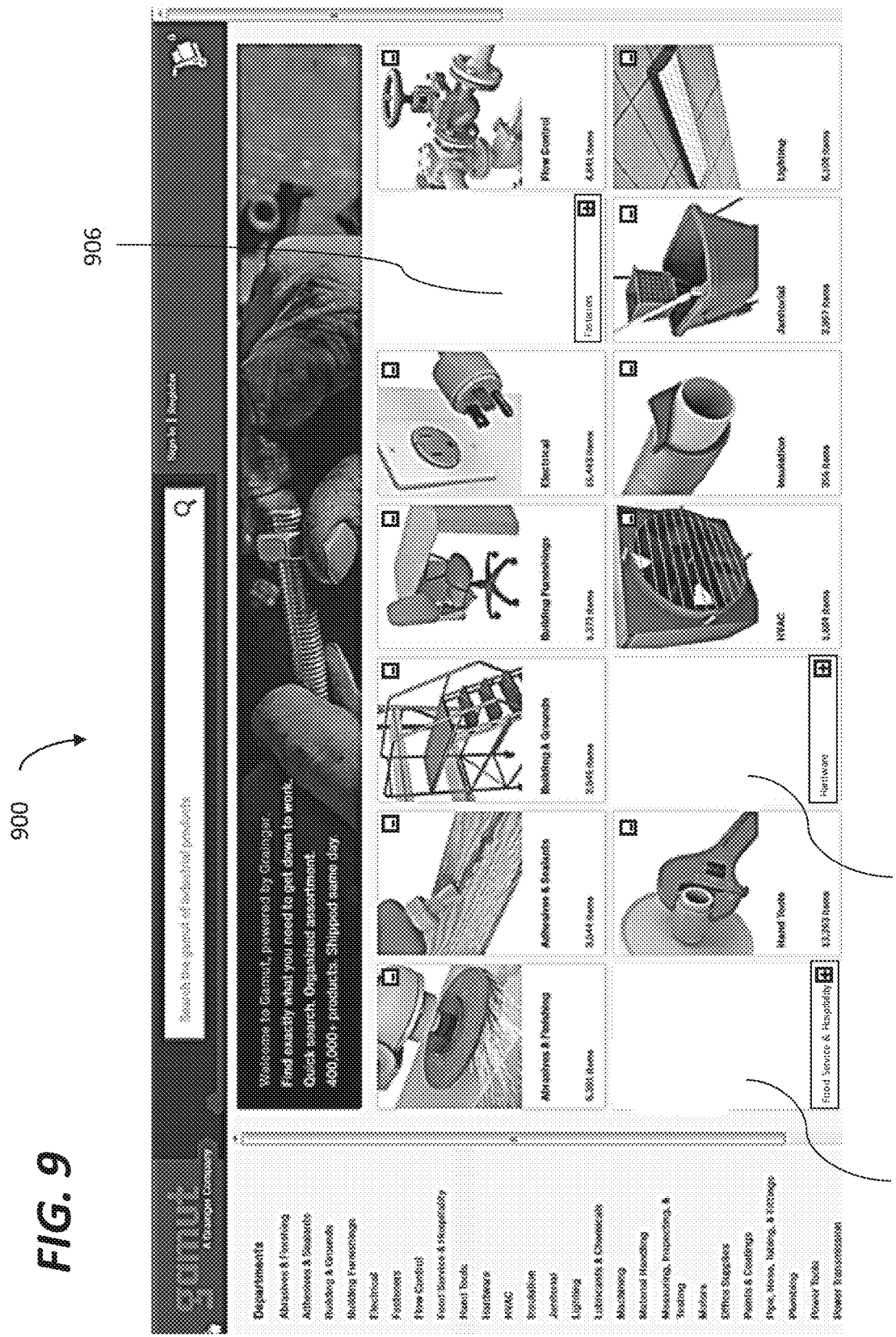
FIG. 9 illustrates an exemplary user interface with multiple minimized display elements.

FIG. 9 illustrates an exemplary user interface 900 with multiple minimized display elements 902, 904, and 906. In other words, the user interface 900 shows more than one minimized product hierarchy images. As described herein, when users in a given community interact with the user interface 900, they can customize their interface by minimizing and maximizing product images that correspond to nodes in a product hierarchy. At first, interface changes a user makes may be visible only to them. As more and more users in the community also interact by minimizing and maximizing hierarchy nodes, the system will decide to propagate interface changes to a given display element, to other users in the community who have not interacted with that display element. In this way, the most commonly purchased-from categories and other display elements in the product hierarchy are easily found. Infrequently purchased-from nodes are minimized. In this way, the system may also adjust an interface for users based on a lack of interaction, rather than on active interaction. In this way, the user interface 900 gets less cluttered and is less overwhelming for users.

When a user interface is sent to a user electronic device that is adjusted based on a community's preferences, a user may also override a minimized or maximized node by maximizing it or minimizing it, respectively, thus overriding the community's action. This action is remembered for that particular user as described herein so that the user will not have to redo that interaction next time they access an interface.

Display elements that are interacted with by users and adjusted according to community associations and behavior may also be display elements other than product hierarchy images. For example, text URLs may be interacted with and adjusted according to community behavior. Each URL may have, for example, a minimize element [–] at the end of it to allow for minimizing. After a URL has been minimized, the URL may be grayed out or otherwise change appearance, may not be clickable, and/or may have a maximize element [+] at the end of the URL. In some embodiments, an administrator of a user interface may permanently lock out categories, links, product hierarchies, individual products, etc. For example, a purchasing manufacturer may lock out products from a from a first vendor if a company has an exclusive contract to purchase from a second vendor. If the products are locked out, they may not appear on an interface at all, may appear but are not maximizable, or may appear and be maximizable but are not selectable for purchase.

As described herein, instead of starting with an interface with all display elements maximized, a vendor or administrator of an e-commerce platform may select a community and aggregate the purchasing behaviors for that community ahead of time and automatically minimize the categories and subcategories from which that community does not purchase from. In other words, a default interface may be determined for a community before members' interactions with that interface is determined. For example, some communities, as a collective, may only purchase 10% to 20% of an entire available product offering. Accordingly, the search results of a typical product search engine creates a lot of noise (or irrelevant search results), which may make it difficult for a user to find relevant products. Therefore, determining default interfaces for a community may make it easier for users to find relevant product for their business, save time of the users, and help increase sales for the vendor. As described herein, the user may still interact with display elements, which can be used to implement further changes to the interface for other members of a community, and may be saved for that user so as to implement those changes for that user in the future.

Figure 10:
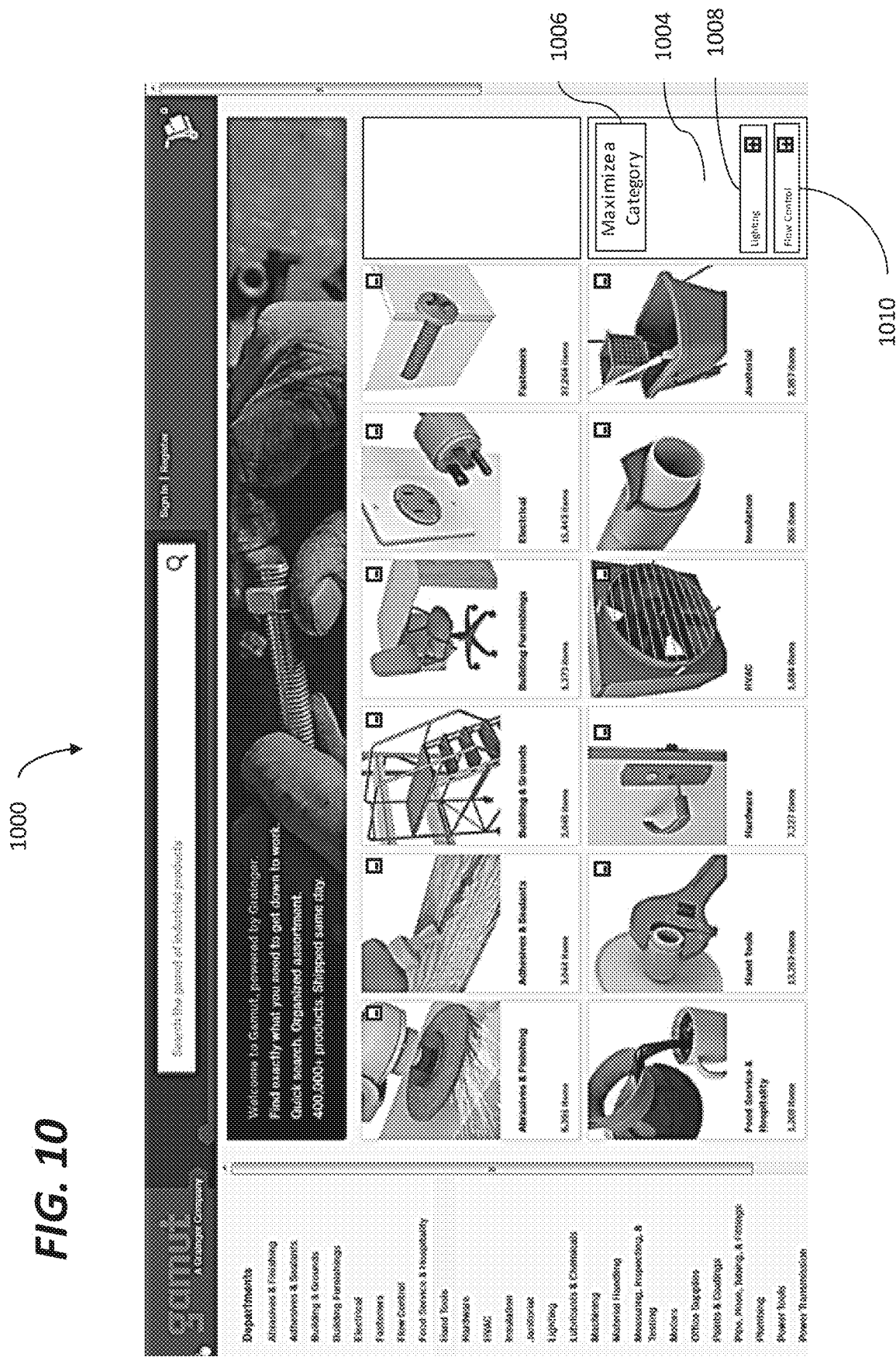
FIG. 10 illustrates an exemplary user interface with multiple minimized and relocated display elements.

FIG. 10 illustrates an exemplary user interface 1000 with multiple minimized and relocated display elements. In particular, in the maximize a category section 1006 of the user interface 1000, space 1004 is provided to display minimized display elements. In the user interface 1000, a lighting display element 1008 and a flow control display element 1010 have been minimized and relocated to the space 1004. In this way, the minimized display elements do not break up maximized elements, making for a more continuous display for the user. If a user maximizing a minimized display element on the right hand side, the system may place it back with the maximized display elements. If the display element had been previously minimized and then maximized, the display element may return to its original position before it was minimized. In some embodiments, maximizing a category may cause some of the other display elements to be rearranged to accommodate the maximized display element. A system may prioritize a maximized display element in the user interface 1000 (e.g., give it a preferred location where eyes are typically drawn, push other display elements down below such that they are only viewable by scrolling, etc.) based on the assumption that a maximized display element is more desirable to a user than a display element that the user has never interacted with.

Figure 11:
FIG. 11 illustrates an exemplary user interface with a community identification display element.

FIG. 11 illustrates an exemplary user interface 1100 with a community identification display element 1102. A community may be identified with by a user selecting one of the communities listed in the community identification display element 1102. For example, a bakery community display element 1104 or a parking garage display element 1106 may be interacted with (e.g., selected by) the user to identify with a particular community. Once one of the community identification display elements 1102 is selected, the user interface may be adjusted so that it appears the way it does to users who are part of the selected community.

In some embodiments, a user may have a collection of community display elements saved and from which to choose. For example, a purchasing manager in charge of acquiring many different types of products for different departments of a company may wish to save different community display elements relating to those various departments. In this way, the user may be able to quickly access user interfaces relating to specific departments/communities. Other community display elements may cause interfaces to be displayed relating to a particular season, time of year (e.g., holidays), for a particular job/role, for a sales promotion, and/or for other targeted marketing efforts (e.g., for highlighting diversity suppliers or newly added products). Even if a user has a collection of community display elements saved, a vendor or other administrator of an e-commerce system may add these types of other promotional community display elements for selection, so that a user may see them even if they are not part of their saved set of community display elements.

In various embodiments, when a user maximizes a product hierarchy node (or otherwise interacts with a display element), a message may be generated and automatically sent by the system to the user (or other users in the community) that highlights products in that product hierarchy node. An email or other message may also be sent to that user's sales representative, database, or marketing system.

In various embodiments, the interactions of a user, including with display elements, may be used to adjust other functionalities of a user interface. For example, if a user minimizes a product hierarchy node, the system may cause a keyword search engine (e.g., as accessed using the search bar display element 402 in FIG. 4) to filter out and remove any items in and below the product hierarchy node minimized by the user, thereby removing results relating to that minimized display element from search engine results. Similarly, if a product hierarchy node display element is maximized, results relating to that product hierarchy node may be included in any searches by the user using the keyword search engine.

As described herein, various factors may be used in combination with one another to determine user interfaces for particular users. For example, users purchase history along with an industry of a user may be utilized to determine user interfaces. For example, by collecting order purchase history for particular users and/or entities, percentile rankings of how much each user/entity purchased as related to other users/entities. Crowdsourced sets from users' interactions in different percentile rankings and industries can be assigned to users in different percentiles. For example, a Fire Station entity which is in the top percentile purchasers of Fire Stations will have a user interface having adjustments to its display elements crowdsourced from other top percentile Fire Stations. Fire Stations which are not purchasing frequently (low percentile) may have a different user interface (with different display elements) than the high percentile Fire Stations. In one example, the low percentile Fire Stations may have a smaller set of maximized category images than the high percentile Fire Stations to help them from being overwhelmed by numerous product offerings.

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transient computer-readable media having computer executable instructions stored thereon that, upon execution by a processing device of an electronic commerce system, cause the processing device to perform operations comprising:
    determining, using a machine learning algorithm, at least one factor for associating a plurality of users with at least one of a plurality of communities of users, wherein the at least one factor is indicative of users that belong to one of the plurality of communities of users, and wherein each one of the plurality of communities of users corresponds to an industry type;
    receiving, from a user electronic device, a request for an electronic document, the electronic document being stored in a memory with a default graphical user interface having a plurality of user interface elements;
    determining, for a user associated with the user electronic device, a first community of users to which the user belongs of the plurality of communities of users;
    automatically creating a modified version of the electronic document by modifying the default graphical user interface based, at least in part, on the determined first community to which the user belongs and data indicative of a number of times each of the plurality of graphical user interface elements of the default graphical user interface of the electronic document was interacted with by other users of the determined first community to which the user belongs; and
    sending, to the user electronic device, the modified version of the electronic document.

2. The non-transient computer-readable media as recited in claim 1, wherein the instructions further cause the processing device to perform operations comprising receiving the data indicative of the number of times each of the plurality of graphical user interface elements was interacted with from a plurality of electronic devices associated with the other users of the determined first community to which the user belongs.

3. The non-transient computer-readable media as recited in claim 1, wherein the data comprises data indicative of the number of times each of the plurality of graphical user interface elements was maximized or minimized.

4. The non-transient computer-readable media as recited in claim 1, wherein the data comprises data indicative of the number of times each of plurality of graphical user interface elements was activated.

5. The non-transient computer-readable media as recited in claim 1, wherein the plurality of graphical user interface elements comprises a graphical user interface element associated with a product category, a product hierarchy, or a product set associated with the determined first community to which the user belongs.

6. The non-transient computer-readable media as recited in claim 1, wherein determining the first community of users to which the user belongs further comprises determining that the user electronic device is in a same region as the other users of the first community.

7. The non-transient computer-readable media as recited in claim 1, wherein determining the first community of users to which the user belongs further comprises receiving a selection from the user electronic device to opt into the first community.

8. The non-transient computer-readable media as recited in claim 1, wherein determining the first community of users to which the user belongs further comprises receiving an assignment of the user or the user electronic device to the first community.

9. The non-transient computer-readable media as recited in claim 1, wherein determining the first community of users to which the user belongs further comprises inferring from an obtained name of a company associated with the user associated with the user electronic device that the user or the user electronic device is employed in a first industry type that is associated with the first community.

10. A method comprising:
    determining, by a processor of a computing device of an electronic commerce system using a machine learning algorithm, at least one factor for associating a plurality of users with at least one of a plurality of communities of users, wherein the at least one factor is indicative of users that belong to one of the plurality of communities of users, and wherein each one of the plurality of communities of users corresponds to an industry type;
    receiving, by the processor from a user electronic device, a request for an electronic document, the electronic document being stored in a memory with a default graphical user interface having a plurality of user interface elements;
    determining, by the processor, for a user associated with the user electronic device, a first community of users to which the user belongs of the plurality of communities of users;
    automatically creating a modified version of the electronic document by modifying the default graphical user interface based, at least in part, on the determined first community to which the user belongs and data indicative of a number of times each of the plurality of graphical user interface elements of the default graphical user interface of the electronic document was interacted with by other users of the determined first community to which the user belongs; and
    sending, by the processor to the user electronic device, the graphical user interface comprising the subset of the plurality of graphical user interface elements.

11. The method as recited in claim 10, further comprising automatically creating the modified version of the electronic document by modifying the default graphical user interface further based on a percentage of the other users of the determined first community to which the user belongs that used each of the plurality of graphical user interface elements.

12. The method as recited in claim 10, comprising automatically creating the modified version of the electronic document by modifying the default graphical user interface further based on past purchases made by a plurality of other users associated with the determined first community to which the user belongs that are associated with companies other than a company of the user.

13. The method as recited in claim 10, wherein determining the first community of users to which the user belongs further comprises inferring from an obtained name of a company associated with the user associated with the user electronic device that the user or the user electronic device is employed in a first industry type that is associated with the first community.

14. An electronic commerce system comprising:
a memory; and
a processor coupled to the memory, wherein the processor is configured to:
determine, using a machine learning algorithm, at least one factor for associating a plurality of users with at least one of a plurality of communities of users, wherein the at least one factor is indicative of users that belong to one of the plurality of communities of users, and wherein each one of the plurality of communities of users corresponds to an industry type;
receive, from a user electronic device, a request for an electronic document, the electronic document being stored in the memory with a default graphical user interface having a plurality of user interface elements;
determine, for a user associated with the user electronic device, a first community of users to which the user belongs of the plurality of communities of users;
automatically creating a modified version of the electronic document by modifying the default graphical user interface based, at least in part, on the determined first community to which the user belongs and data indicative of a number of times each of the plurality of graphical user interface elements of the default graphical user interface of the electronic document was interacted with by other users of the determined first community to which the user belongs; and
send, to the user electronic device, the graphical user interface comprising the subset of the plurality of graphical user interface elements.

15. The system as recited in claim 14, wherein the data comprises a number of times each of the plurality of graphical user interface elements was maximized.

16. The system as recited in claim 14, wherein the data comprises a number of times each of the plurality of graphical user interface elements was minimized.

17. The system as recited in claim 14, wherein the default graphical user interface is further modified based on a predetermined threshold of other users of the determined first community to which the user belongs using each of the plurality of graphical user interface elements.

18. The system as recited in claim 14, wherein determining the first community of users to which the user belongs further comprises inferring from an obtained name of a company associated with the user associated with the user electronic device that the user or the user electronic device is employed in a first industry type that is associated with the first community.

19. The system as recited in claim 14, wherein the plurality of user interface elements comprise a plurality of user interface elements for use in submitting search terms to a search engine.

* * * * *